United States Patent
Kallulli

(10) Patent No.: US 7,167,824 B2
(45) Date of Patent: Jan. 23, 2007

(54) METHOD FOR GENERATING NATURAL LANGUAGE IN COMPUTER-BASED DIALOG SYSTEMS

(75) Inventor: Dalina Kallulli, Vienna (AT)

(73) Assignee: Sail Labs Technology AG, Vienna (AT)

(*) Notice: Subject to any disclaimer, the term of this patent is extended or adjusted under 35 U.S.C. 154(b) by 890 days.

(21) Appl. No.: 10/367,187

(22) Filed: Feb. 13, 2003

(65) Prior Publication Data

US 2003/0212545 A1    Nov. 13, 2003

(30) Foreign Application Priority Data

Feb. 14, 2002    (AT) ............................... GM92/2002

(51) Int. Cl.
  *G06F 17/20*    (2006.01)
(52) U.S. Cl. .......................................... 704/8
(58) Field of Classification Search ............... 704/8, 704/9, 257, 270
  See application file for complete search history.

(56) References Cited

U.S. PATENT DOCUMENTS

| 5,383,121 | A | 1/1995 | Letkeman |
| 6,246,981 | B1 * | 6/2001 | Papineni et al. ............ 704/235 |
| 6,505,162 | B1 * | 1/2003 | Wang et al. ................ 704/275 |
| 6,510,411 | B1 * | 1/2003 | Norton et al. ............... 704/254 |

FOREIGN PATENT DOCUMENTS

| DE | 4237563 A1 | 5/1993 |
| DE | 19825205 A1 | 1/1999 |
| DE | 19721684 A1 | 7/1999 |
| EP | 1058235 A2 | 12/2000 |
| WO | WO 00/16310 A1 | 3/2000 |
| WO | WO 01/31434 A2 | 5/2001 |

* cited by examiner

*Primary Examiner*—Abul K. Azad
(74) *Attorney, Agent, or Firm*—Townsend and Townsend and Crew LLP

(57) ABSTRACT

The invention relates to a method for generating natural language in computer based dialog system. The invention generating an input tree from an input file of a simple semantic representation language (SSRL) statements; inserting elementary syntactic information into the tree; applying elementary operations such as sub-tree insertion and manipulation; accessing lexical and language specific information; generating syntactic structures oriented towards normalized interface structures from the structured deep syntactic input tree; realizing and expanding structure types by inserting and/or transforming of pre-defined structures, inserting determiners and ordering sub-structures; generating morphologic transformations; carrying out final refinements, comprising phonetic refinement, pretty print and/or cleaning operations of the tree and the node decorations and outputting a graphic and/or textual representation of the final tree structure.

7 Claims, 13 Drawing Sheets

METHOD FOR GENERATING NATURAL LANGUAGE IN COMPUTER-BASED DIALOG SYSTEMS

BACKGROUND OF THE INVENTION

1. Field of Invention

The present invention relates to the field of interactive human-machine communication. More specifically, it describes a novel method of generation of natural language in dialog systems.

We describe the so-called Sail Labs Answer Generator (SAG), a real-time, multilingual, general-purpose generation system that enables the use of dynamically generated natural language for dialog applications. That is, SAG does not require developers to specify all possible natural language outputs before runtime. SAG consists of a tactical generation component and specifies an interface to the lexicon as well as an interface to a strategic component. SAG emphasizes modularity, quality and speed of generation.

2. Description and Disadvantages of Prior Art

Natural Language Generation (NLG) is the subfield of artificial intelligence and computational linguistics that focuses on computer systems that can produce understandable texts in some human language (cf. Reiter and Dale 2000). The input to NLG is typically some underlying non-linguistic representation of information, from which text in a variety of forms (e.g. documents, reports, explanations, help and error messages) is automatically produced.

NLG is an emerging technology with many applications both real-world and potential. For instance, NLG technology is used in commercial applications in partially automating routine document creation. It is also being used in the research laboratory to present and explain information to people who do not wish to deal with non-linguistic data. Research on NLG has so far focused on the generation of entire documents (e.g. user manuals, etc.), a particularly interesting field as it promises to compensate specifically for the stagnation in the field of machine translation. However, very few systems, mainly research projects, have used NLG technology for real-time applications. Commercial applications in the area of dialog systems to date use NLG technology mainly in its most primitive and restricted form, namely canned text. In the longer term, it is in the domain of dialog systems that NLG is likely to play an important role to allow richer interaction with machines than is possible today.

The present invention relates precisely to using NLG technology in dialog systems by replacing the canned text and/or template-based approach to the task of realization by dynamic generation.

In order to understand the significance of using dynamic generation for NLG systems a couple of words on how realization relates to NLG are in place.

Realization is one of the standard component modules of natural language generation. It is also commonly referred to as the tactical generation or the HOW generation as opposed to the strategic or the WHAT generation (cf. McKeown 1985), which is often also referred to as the text planning component. (While there is some variation with respect to the architecture of a natural language generation system and the exact division of labor among the comprising modules, all generators involve a realization task. For instance, Reiter and Dale (2000) operate with a three-layer architectural model, distinguishing between a document planning module, a microplanning module and a realization module.) Generally speaking, the text planning component produces an abstract specification of the text's content and structure, using domain and application knowledge about what information is appropriate for the specified communicative goal, user model and so on. The realization component on the other hand determines how best to package information into chunks of natural language and ultimately converts the abstract specification supplied by the text planning component into real natural language text.

Standard approaches used for realization are: canned text, template, phrase-based and feature-based realization (cf. Hovy 1997).

A canned text is a predefined string written by the system designer before runtime to achieve a given communicative goal (e.g. warning, suggestion) whenever its trigger is activated. This method of realization has been widely used to generate error or help messages for a multitude of computer applications.

A template is a predefined form whose empty fields are filled by information provided by either the user or the application at runtime. The input to a template-based system is some feature structure with variable corresponding values. A well-known instance of template-based realization is mail-merge programs. Template-based systems are thus more sophisticated and more flexible than canned text systems and they are arguably faster and thus more appropriate for real-time applications because the size and number of structures to be traversed are relatively small. However, even though the quality of template-based systems is higher than that of canned text systems, the degree of control on the output text is not as fine-grained as might be desirable and generally compares unfavorably to that provided by grammar-based systems.

Phrase-based systems may be conceived of as generalized templates that represent different types of phrases found in some natural language. These phrases are related to each other by a set of rules (a grammar) that specifies the structural description of well-formed natural language utterances.

In feature-based realization systems each possible minimal expression alternative is represented by a single feature (for instance, a noun is either definite or indefinite, singular or plural, etc.). The generation process involves either traversing a feature selection network or by unification with a grammar of feature structures until a complete set of feature value pairs is collected to realize each part of the input. The simplicity of their conception and their flexibility make feature-based systems very powerful. Feature-based systems allow for the realization of very high quality text. However, due to the fact that normally the entire grammar and not just the input to realization must be traversed, such systems are not optimal for real-time applications.

There are a number of reasons why dynamic generation is to be preferred over simpler methods of text realization such as canned text. While canned text systems are trivial to create, they are also highly inflexible and wasteful on resources. One obvious advantage of dynamic generation across the board is customizability. Turning to the unique needs of dialog systems, the generation speed is a central issue since interaction must occur in real-time. As has often been pointed out in the relevant literature (cf. McRoy et al. 2001), natural language realization systems can address this constraint in two ways: either the system designer must anticipate and specify all possible natural language outputs before runtime and supply the necessary program logic to produce the correct sequence at the correct time and hope that problems will never arise, or the system must be able to dynamically generate natural language outputs in real time. Depending on the aims of design and specifically the need to build software that provides increasingly more customized responses to users, the time and effort required to integrate a potentially complicated piece of software such as dynamic generation often pay off in the long run and compare favorably to the time and effort required to manually generate all output strings.

In the context of dialog systems, existing generators are either too slow (e.g. Penman [Mann 1983], FUF/SURGE [Elhadad 1992 and 1993]) since their approaches traverse the entire generation grammar rather than the input to be generated; or their grammar is too limited (e.g. TEXT [McKeown 1985]) leading to customization and portability problems; or the implementation of grammar is tightly bound to a grammatical theory that is syntactic or structural as opposed to semantic or functional (e.g. Mumble [Meteer et al. 1987]) thus leading to a need that an application include a rather detailed amount of information on the syntax of the target language; or realization is implemented as a production system (e.g. TG/2 [Busemann 1996, Busemann and Horacek 1998]) which is not suitable for real-time systems because of the inherently inefficient derivation of results in such systems; or realization is handled by employing statistical approaches which may provide ungrammatical results (e.g. Nitrogen [Knight and Hatzivassiloglou 1995, Langkilde and Knight 1998a and 1998b]); or the realization system implements a template-based approach (e.g. YAG [McRoy et al. 2001]) which again compromises quality of output. For a detailed overview of some of the best existing realization systems see Reiter and Dale (2000) and McRoy et al. (2001).

SUMMARY OF THE INVENTION

Objective of the Invention

An objective of the invention is to improve efficiency and flexibility of dynamic natural language generation for real-time applications through a number of innovative design choices and trade-offs.

Summary and Advantages of Proposed System

Most existing approaches to realization are purely declarative. Declarative here means that the generation system defines a generic algorithm that controls how the input and grammar specifications are combined to yield the output of the generation process which can then be linearized into text.

The system we propose differs from these declarative approaches in that it is procedural. In contrast to declarative approaches which define a set of conditions that have to hold in the outputs and rely on a generic algorithm to verify whether a certain input matches to a structure that fulfills these conditions, a procedural approach is one that allows for the specification of a sequence of procedures from a set that should be applied to transfer inputs into outputs.

In the proposed system, this procedural approach comprises the following steps:

Generation level 1: generating a semantic-pragmatic deep structure from the input file received from the strategic component.

Generation level 2: assigning syntactic functions and categories.

Generation level 3: application of elementary operations such as sub-tree insertion and manipulation (for instance, identification of coordinations, attributes and relations) is carried out.

Generation level 4: accessing lexical and/or language specific information. After evaluating the notions/concepts supplied by the strategic component, notions/concepts are replaced by canonical forms through access to the lexicon. The lexicon access allows the application of multilingual facilities.

Generation level 5: evaluation of the deep-structured syntactic tree. This level generates syntactic structures (oriented towards interface structures) and takes care of gapping phenomena and insertions as language specific parts as well as the ordering of sub-clausal structures.

Generation level 6: structure type realization and expansion. This level takes care of the insertion and/or transformation of pre-defined structures, determiner insertion, as well as ordering of NP and AP substructures.

Generation level 7: morphologic generation. At this level, the call to the morphological generation component ('flexer tool') is performed.

Generation level 8: final refinement. At this level, phonetic refinement, pretty print and cleaning operations of the tree and the node decorations are carried out.

Generation level 9: output functions. This level provides a graphic representation of the final tree structure and output of the text string.

In contrast to declarative approaches, the procedural approach of the proposed system provides fine-grained control of each processing step on the way from input to output representations. This is potentially more efficient for specific generation applications as the procedural behavior of the generator can be tailored to the task at hand.

Designers of generation systems must normally consider the trade-off between the quality of text and the speed of realization. Typically, phrase-based and feature-based systems, which yield very high quality text, are not optimal for real-time applications as generation speed in such systems is normally a function of the grammar size because it is searched during realization. The art of a good generation grammar consists in the balance of generality and efficiency. Because a procedural system, like the one we propose, is more specific than a declarative one, it is better suited for time-critical real-world applications.

So, a clear advantage of the proposed system over state-of-the art systems is that it enables the combination of generation speed and fine-grained control of text.

BRIEF DESCRIPTION OF THE DRAWINGS

An embodiment of the invention is explained in detail below. Reference is made to the attached drawings, wherein.

DESCRIPTION OF THE PREFERRED EMBODIMENTS

Figure 1:
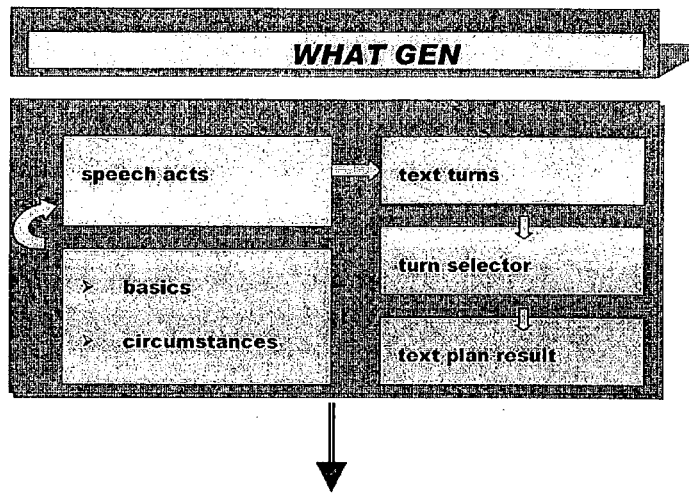
FIGS. 1 and 2 depict the various components of the method according to the invention and the interaction among these components.

The invention addresses the task of dynamic natural language generation in a conversational system. It allows for the combination of both speedy and high-quality output of text realization.

In addition to use in dialog systems, the present invention could be used for other real-time applications (e.g. natural language interfaces to databases). Some parts of the present invention (SSRL) could be used for other tasks of linguistic knowledge representation (such as text summarization).

The invention consists in a specific method that has been developed to enable a natural language generation system for real-time applications. This method comprises a sequence of steps. In the preferred embodiment of the invention, these steps are realized by a set of tools, comprising Comprendium Kernel 5.0 developed at Sail Labs, which interprets the LISP-like so-called Lingware programming language; the Simple Semantic-pragmatic Representation Language (SSRL); a Generation-directed Knowledge Representation Language (GDKRL); and a dictionary-free flexing algorithm for morphological generation.

a) Component Description: Overview

In the proposed system, the tactical generation starts from semantic-pragmatic representations, which consist of a set of statements (predicates and meta predicates) containing semantic, syntactic, pragmatic and morphological information that constitutes the content of the text to be generated. The elements of the representations are so-called Simple Semantic Representation Language (SSRL) expressions. The SSRL language describes event and entity nodes of a network, their properties, and links among them. An example illustrating the SSRL input that would ultimately generate the sentence "Your order consists of an extra large pizza with cheese, artichokes, peppers and ham, a medium bottle of coca-cola and a dessert with cream" is given below in example (1).

The SSRL representations are created by a text planning process (the strategic component generating the WHAT), which determines the content and (abstract) structure of an utterance. SSRL representations serve as an interface between strategic and tactical generation.

The tactical generation uses the programming environment of the Comprendium Kernel 5.0 developed at Sail Labs, which interprets the Lingware programming language that the generation grammar is written in.

Lingware is based on a set of LISP and LISP-like functions, that is, built-in functions on the basis of LISP, which represent linguistic operators for natural language processing. It has been used in the context of Machine Translation for analysis, transfer and generation grammars at Sail Labs. It is being used for the first time to write generation grammars for conversational systems. In what follows, program parts of the generation grammar are called (lingware-) procedures.

Each expression of the representation language has a corresponding lingware procedure with the same name. Thus, the names of the SSRL expressions simultaneously represent representation language units and program parts of the tactical generator.

The sequences of SSRL statements are prompted by actions initiated or specified by the application (e.g. a dialog manager). Specific SSRL statements are, in turn, triggered by calling the corresponding homonymous procedures.

The tactical natural language text generation consists in creating deep and surface tree descriptions as well as morphologically well-formed sequences of text units. The tree structures are generated in different steps by well-defined sequences of lingware procedures which represent the implemented linguistic grammar.

A dictionary-free flexing algorithm ('flexer') is applied for morphological generation. This component is also integrated into the tactical component.

Tactical Generation: input and output

Input: SSRL representation

EXAMPLE (1)

(state "x1" "consist")
(experiencer "x2" "x1" "x3")
(entity "x3" "order")
(attribute "x4" "your")
(has-attr "x5" "x3" "x4")
(related "x50" "of" "x1" "x11")
(entity "x11" "pizza")
(comb "x16" "with" "x11" "x17")
(entity "x17" "cheese")
(logical "x18" and "x17" "x19")
(entity "x19" "artichoke")
(logical "x20" and "x17" "x21")
(entity "x21" "ham")
(logical "x22" and "x17" "x23")
(entity "x23" "pepper")
(logical "x24" and "x11" "x25")
(entity "x25" "bottle")
(related "x28" "of" "x25" "x29")
(entity "x29" "coca-cola")
(attribute "x26" "medium")
(has-attr "x27" "x25" "x26")
(logical "x52" and "x11" "x51")
(entity "x51" "dessert")
(comb "x55" "with" "x51" "x56")
(entity "x56" "cream")
(attribute "x12" "large")
(has-attr "x13" "x11" "x12")
(attribute "x14" "extra")
(has-attr "x15" "x12" "x14")
(number "x11" sg)
(defness "x11" indef)
(number "x25" sg)
(defness "x25" indef)
(number "x51" sg)
(defness "x51" indef)
(number "x17" sg)
(defness "x17" gen)
(number "x19" pl)
(defness "x19" indef)
(number "x21" sg)
(defness "x21" gen)
(number "x23" pl)
(defness "x23" indef)
(number "x29" sg)
(defness "x29" gen)
(number "x56" sg)
(defness "x56" gen)
(tense "x1" pr)
(smood "x1" dcl)

Figure 3:
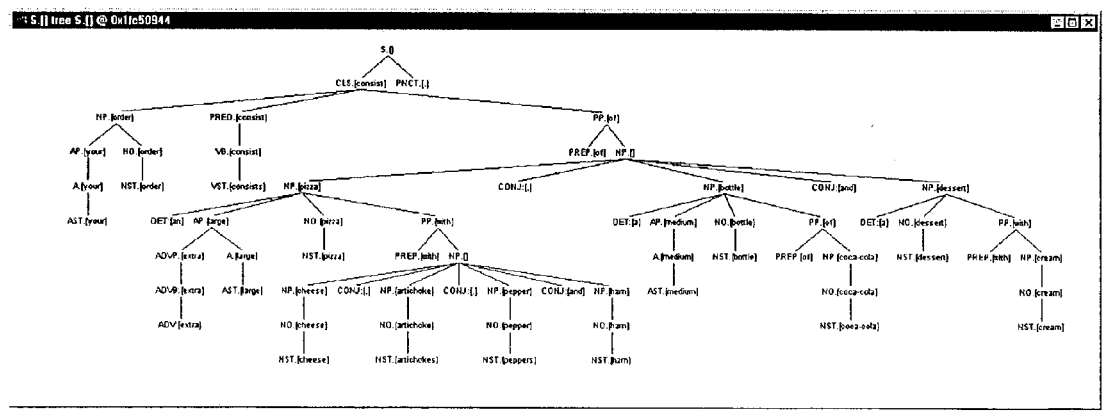
FIGS. 3 to 15 depict the various generation steps of the present invention.

The resulting tree structure is depicted in FIG. 3.

The resulting text output—sentence is: "Your order consists of an extra large pizza with cheese, artichokes, peppers and ham, a medium bottle of coca-cola and a dessert with cream."

b) Functionality: Component Features

The procedural rules of the proposed system use feature structures and unification of feature structures to determine the applicability of both phrase structure rules and feature instantiations.

The tactical generation proceeds from an initial tree structure and the SSRL representation, which reflects the semantic, pragmatic and lexical content of an utterance.

The initial tree is defined as a double branching structure with a root (named S as a symbol for sentence) and two (text-) limiting sons, symbolized by $, as depicted below:

The respective SSRL representation is generated by a preceding (strategic) component, which either is part of an application (e.g. for database question/answer applications where a direct answer has to be given based on the database search results), or an intermediate component between the application and the tactical generation, such as within conversational systems. In this latter framework, a dialog management component predefines and plans the extension of system utterances and sends them to the text modeling component, which in turn supplements the elementary information provided by the dialog manager and determines the final sequence of SSRL statements. This sequence constitutes the basis for the tactical generation.

The different SSRL statements in terms of meaningful units of the representation correspond to functions and program parts of the text generator. These functions initiate the generation process. The names of the representation units and the lingware functions are identical: an SSRL statement as part of the representation at the same time represents a specific part of the generation lingware which is called up by a procedure bearing a name which is identical to that of the SSRL statement. For instance, an SSRL statement (action x1 "start") calls the lingware procedure (action x1 "start"), where action is the name of the called sub-program and x1 and "start" are the arguments of the procedure.

This action procedure makes sure that a node is inserted into the tree structure and puts pointers, features and values onto the node in compliance with its parameters—here, the pointer ev-id x1 and the notion "start". Lingware procedures matching the SSRL statements perform the first step of the generation process: they insert new nodes into a flat tree structure and assign additional information to the nodes. Thus, the first step of the tactical generation consists in creating a basic tree structure with decorated nodes corresponding to the current SSRL representation.

If the complete sequence of SSRL statements is exhausted, that is, if all respective lingware procedures are called and executed, a flat semantic-pragmatic tree which represents the utterance to be realized has been generated. The nodes of the tree possess elementary feature value pairs. They consist of linguistic functions and relational indicators.

Further procedures are called on the subsequent generation layers in a well-defined order. They build the structural description by starting from the deep semantic-pragmatic tree up to creating a surface-structure tree. A separate morphologic generation component is called in order to generate morphologically well-formed surface strings for the output of the generation.

To sum up, during the generation process, the realizer generates flat deep structures from semantic-pragmatic expressions, then syntactic deep structures from the deep semantic-pragmatic structures and from these syntactic deep structures surface strings. With a view to the internal process, the following steps can be distinguished:

the first part converts semantic-pragmatic expressions into a flat deep tree structure and is totally language independent;

the second part converts the semantic-pragmatic tree into a deep syntactic tree, which still is language independent;

the third part converts the deep, language independent syntactic structure into a language dependent surface structure and a well-formed text sequence of inflected words.

Thus, the most important and general type of operation performed by the text generation is to convert or transform tree structures. For this purpose, the following means are employed:

a predefined inventory of operators delivered by the used lingware;

in particular, the transformation formalism (the xfm operator) of the lingware;

the definition of elementary and specific lingware procedures which insert sub-trees into already generated trees or modify them (this method is comparable to the procedure of Tree Adjoining Grammars (so-called TAGs) (cf. Joshi 1987))

the sub-tree context is defined by node decorations;

transformations are defined by context conditions which are composed by structure descriptions and node decorations.

Figure 2:
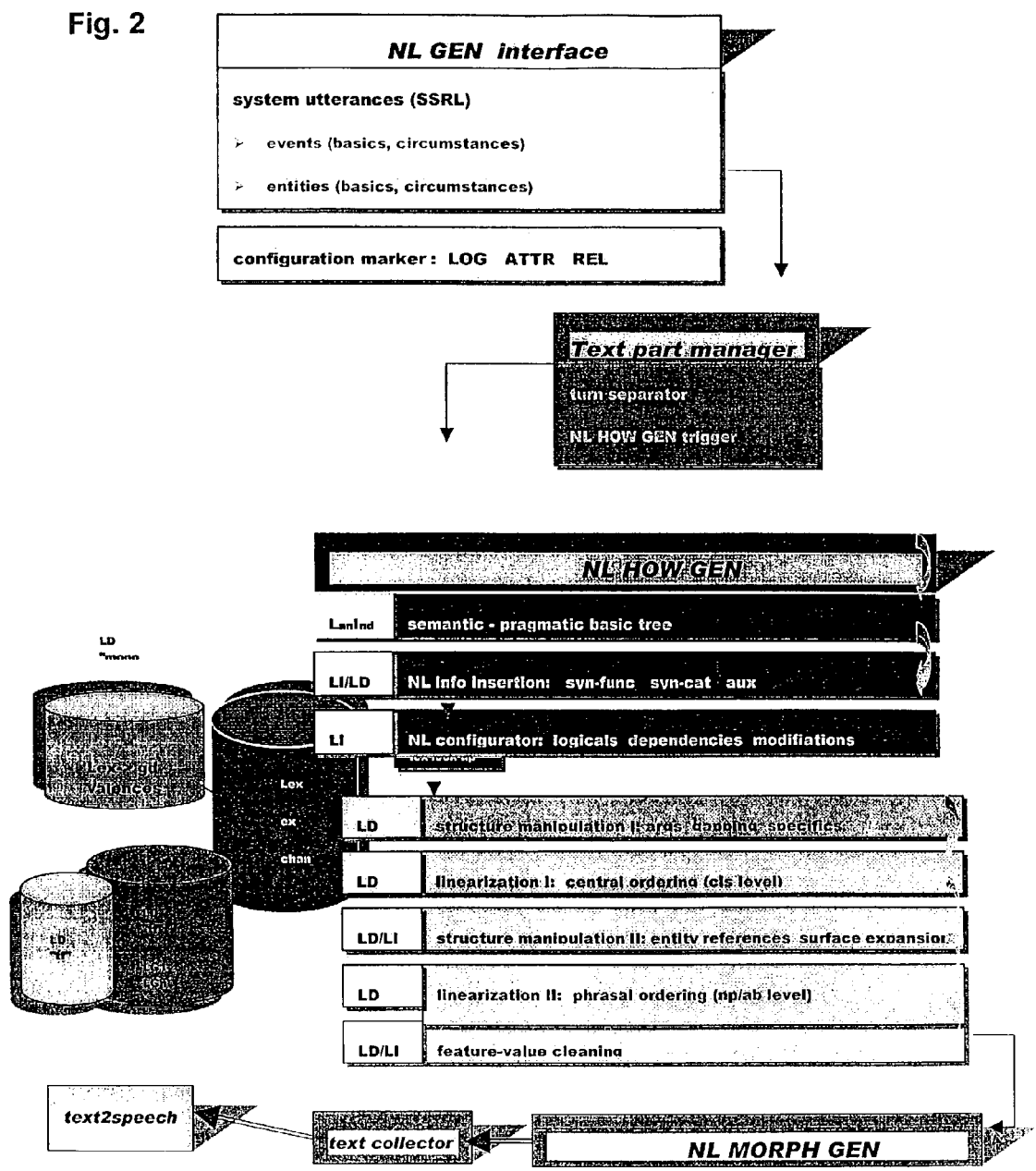

An overview of the various components with respect to dynamic generation and the interaction among these components is depicted in FIGS. 1 and 2.

c) Workflow: Generation Levels

Initial Operations

The initial generation call g which has as parameter a series of SSRL statements calls the procedure generate which has as parameter the SSRL input file. The procedure generate reads the current SSRL-sequence representation and calls up xfm, an (lingware) operator with two arguments, namely description of the input tree structure and transformed output structure, which creates the initial tree structure and/or resets former result trees.

After creating the initial tree, generate calls up step-by-step the procedures described below which carry out the generation.

EXAMPLE (2)

SSRL input file for generating the sentence: "The phone number is used to identify your records in our files."
(action "x1" "use")
(object "x2" "x1" "x3")
(entity "x3" "number")
(related "x4" "comp" "x3" "x5")
(entity "x5" "phone")
(action "x6" "identify")
(object "x7" "x6" "x8")
(entity "x8" "record")
(attribute "x9" "your")
(has-attr "x10" "x8" "x9")
(space "x11" "in" "x6" "x12")
(entity "x12" "file")
(attribute "x13" "our")
(has-attr "x14" "x12" "x13")

(number "x3" sg)
(number "x8" pl)
(number "x12" pl)
(defness "x3" def)
(defness "x8" indef)
(defness "x12" indef)
(tense "x1" pr)
(voice "x1" pas)
(smood "x1" dcl)
(smood "x6" dcl)
(sentence-type "x1" main)
(sentence-type "x6" infin)

Figure 4:
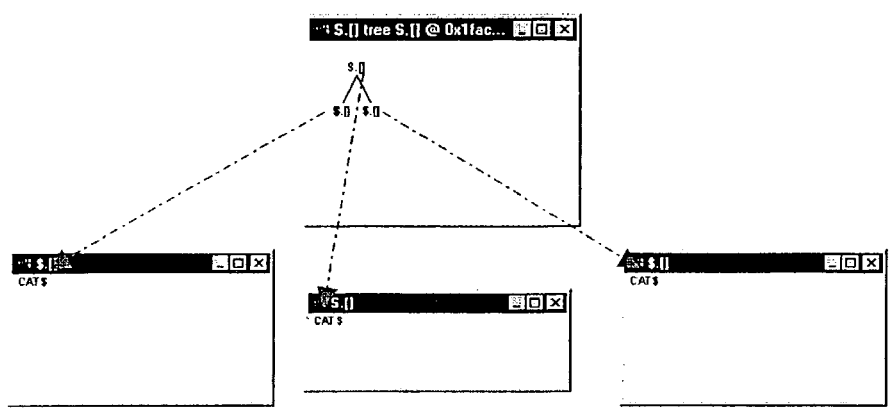

The initial tree is depicted in FIG. 4.

Generation Level 1: Generating a Semantic-Pragmatic Deep Structure

In order to complete the initial tree (S→$ $) each statement of the respective SSRL-sequence representation is evaluated. The result of this evaluation is a flat semantic-pragmatic tree. The evaluation itself is performed by the function evals, which has as parameter the sequence of SSRL statements.

Figure 5:
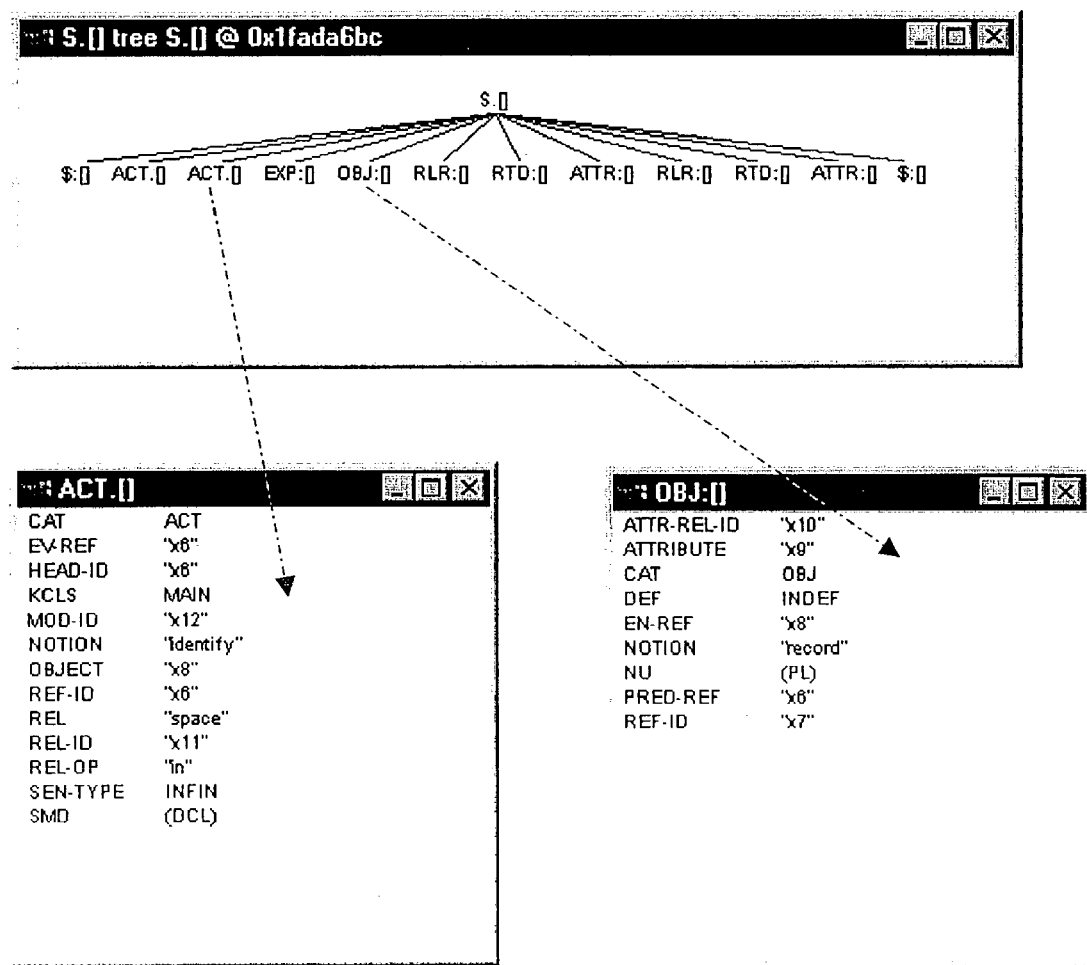

The flat semantic pragmatic tree is depicted in FIG. 5.

Generation Level 2: Assigning Syntactic Functions and Categories

Three procedures, put-syn-func, insert-syn-cat, aux-insert, insert elementary syntactic information into the tree structure and onto the tree nodes. These procedures have no parameters.

Figure 6:
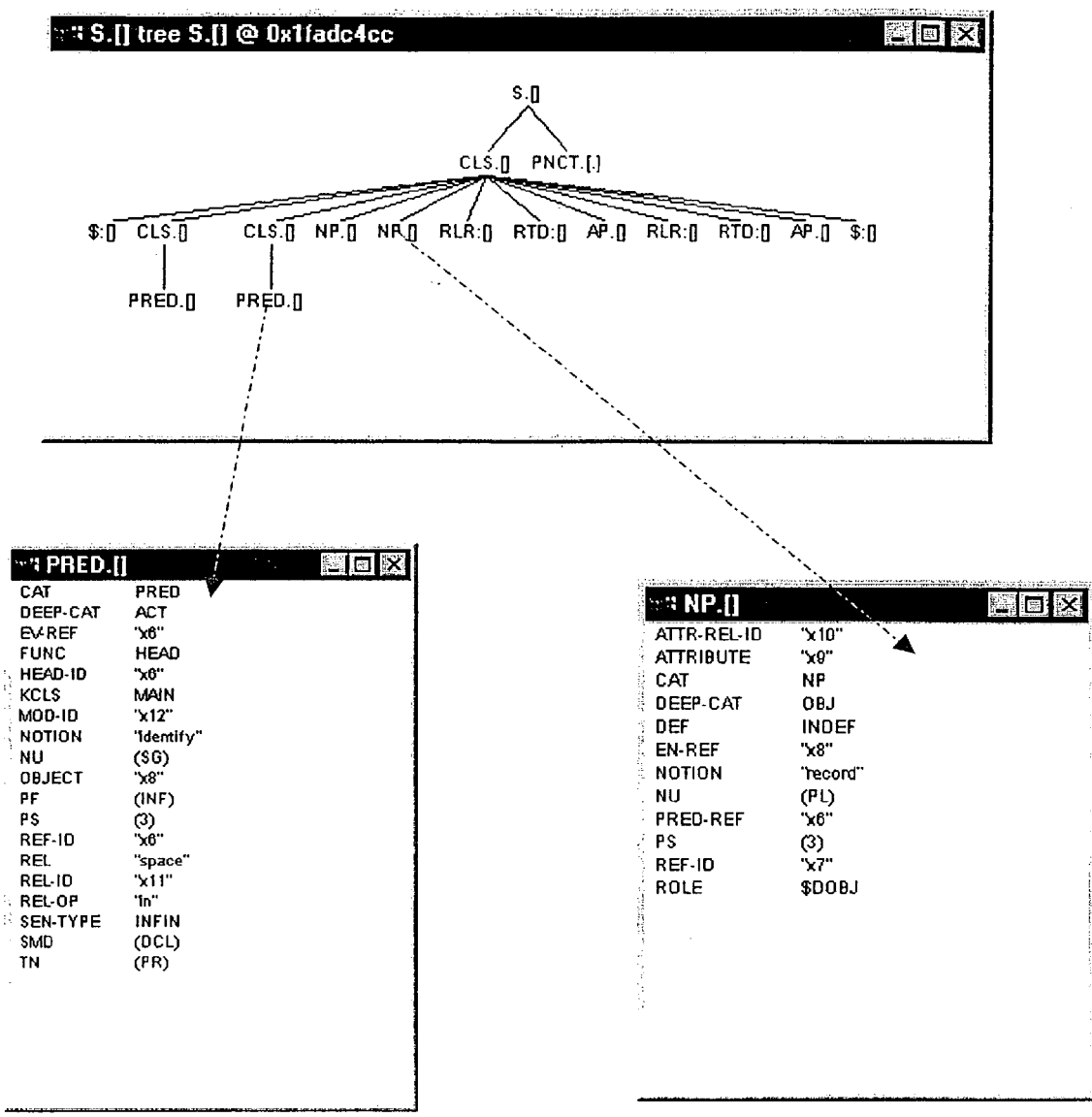

A flow chart of insertion of syntactic categories is depicted in FIG. 6.

Generation Level 3: Application of Elementary Operations

After evaluating the deep input tree, elementary operations such as sub-tree insertion and manipulation (for instance, identification of coordinations, attributes and relations) are applied. The respective procedures are: logicizer, attributor and relator. They do not have parameters.

Figure 7:
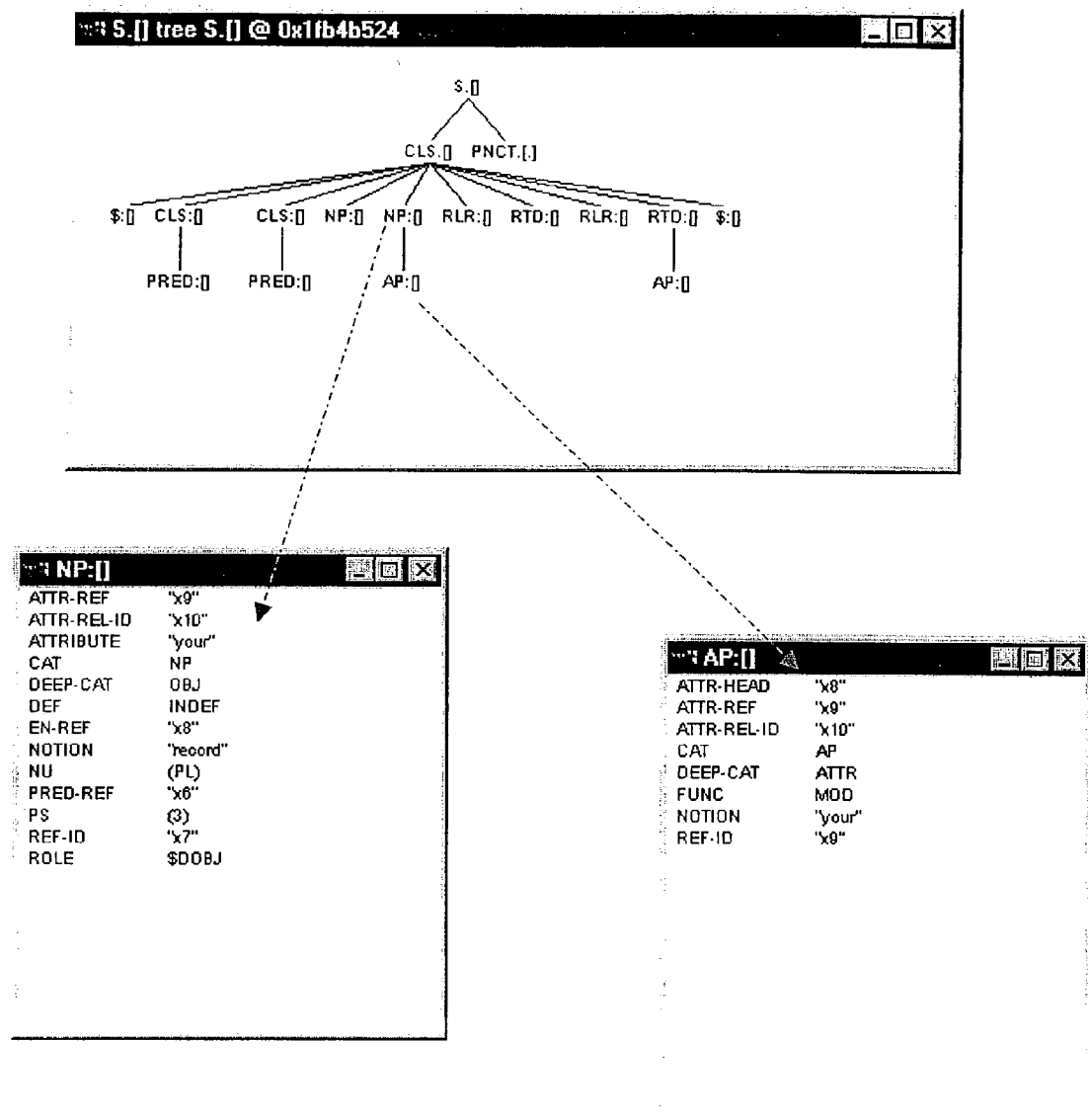
Figure 8:
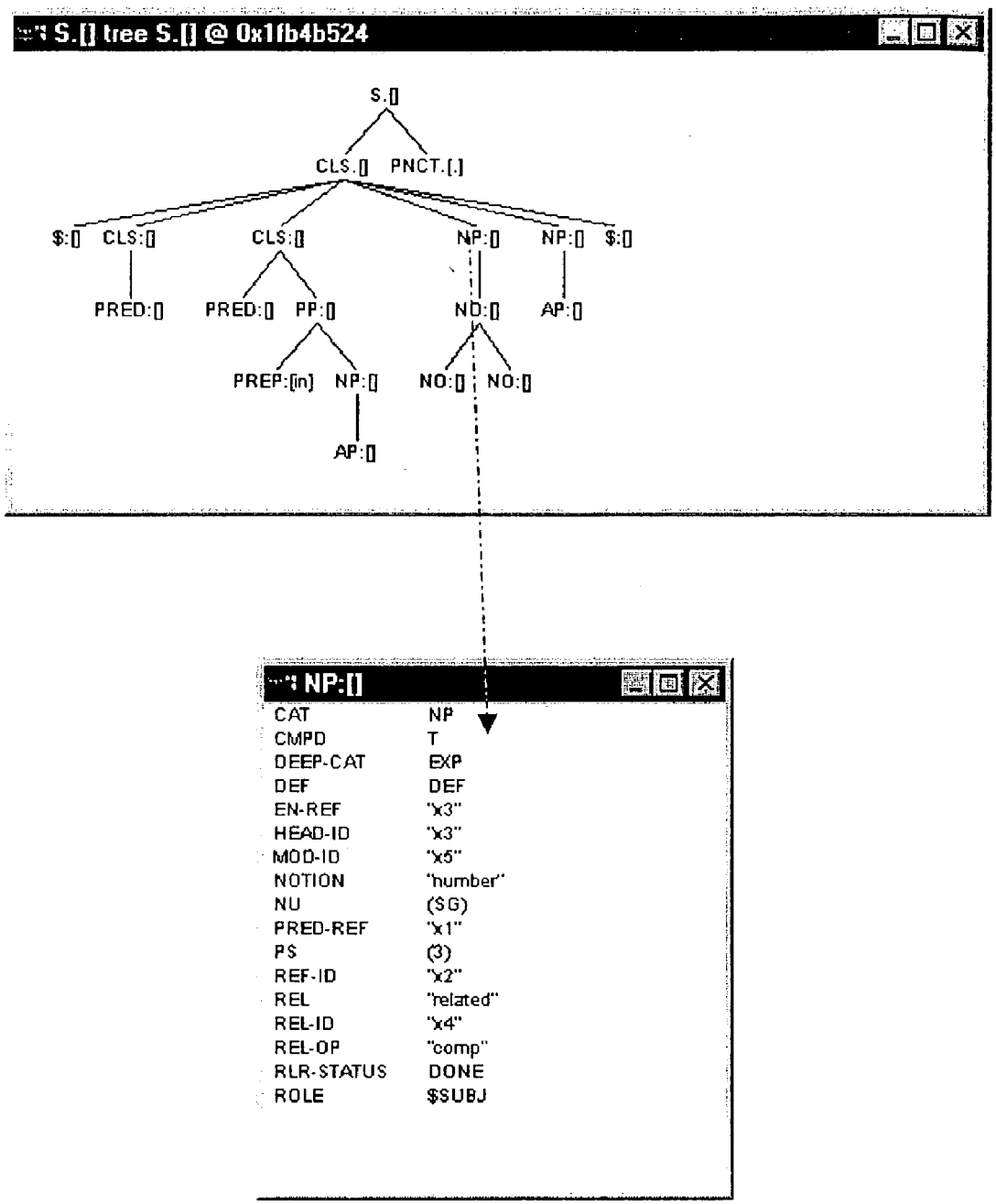

Identification of logical connections and attributes is depicted in FIG. 7, the identified relations are depicted in FIG. 8.

Generation Level 4: Accessing Lexical and/or Language Specific Information

After evaluating the notions/concepts supplied by the strategic component, notions/concepts are replaced by canonical forms via access to the lexicon. The lexicon access allows the application of multilingual facilities. The respective functions that perform lexicon access are get-prep-can and get-lex-info. They do not have parameters.

Figure 9:
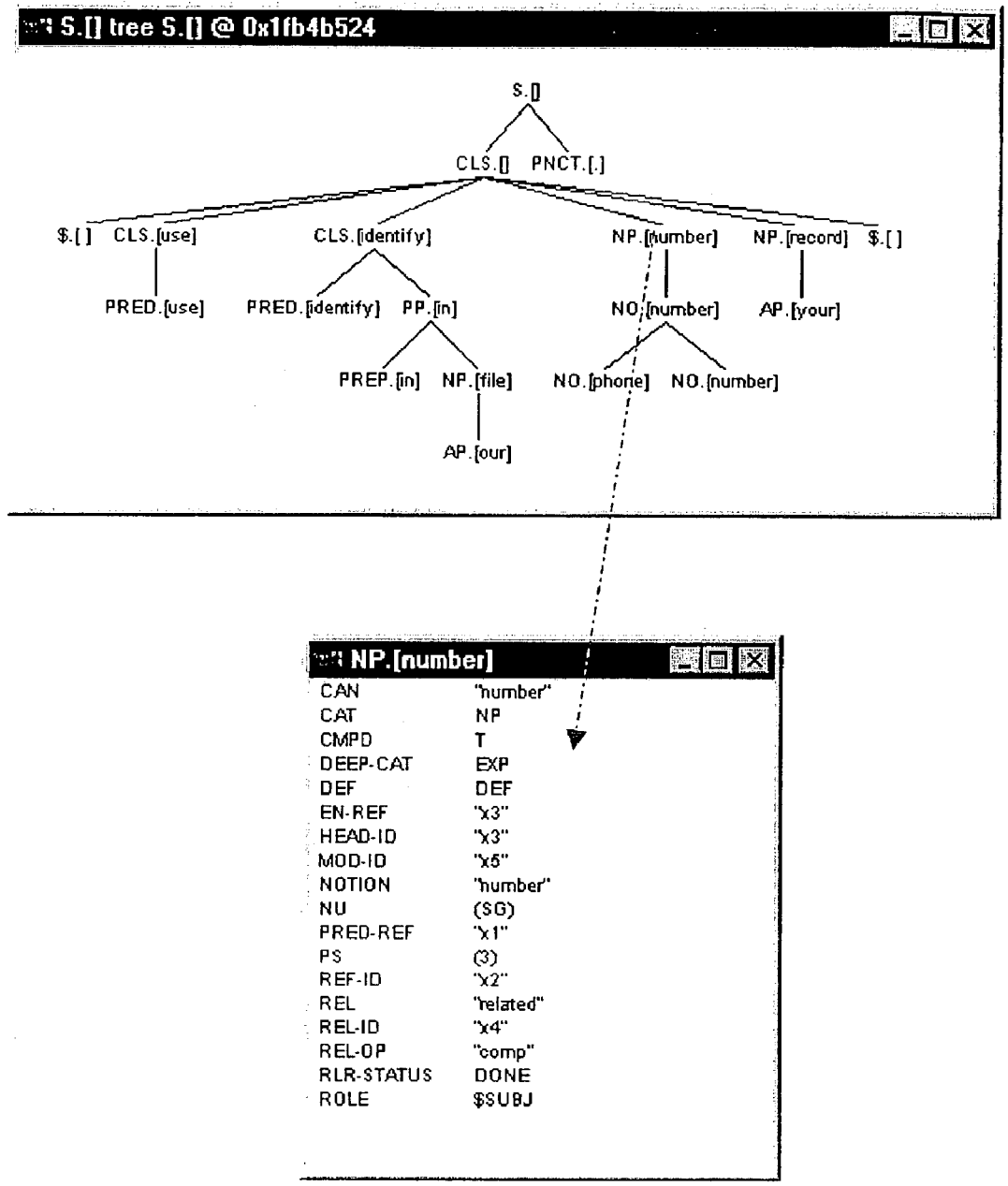

FIG. 9 shows the lexicon lookup, particularly insertion of canonical forms (base lexemes).

Generation Level 5: Evaluation of the Structured Deep Syntactic Input Tree

This level generates syntactic structures (oriented towards normalized interface structures) and takes care of gapping phenomena and insertions as language specific parts as well as the ordering of sub-clausal structures. The respective functions are: internal-cls-structure, insert-specific-structure, del-ident-phrase, and cls-order. These functions do not have parameters.

Figure 10:
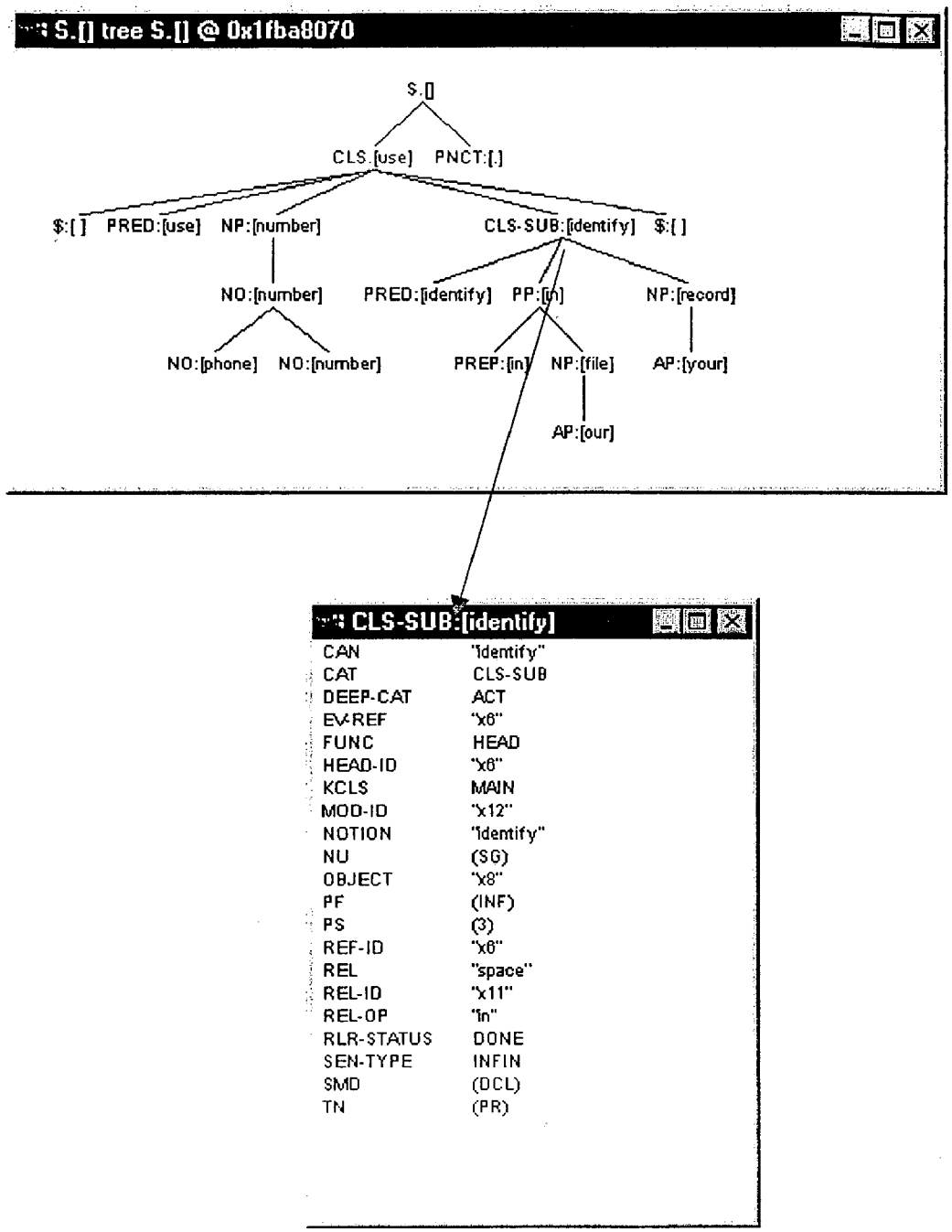
Figure 11:
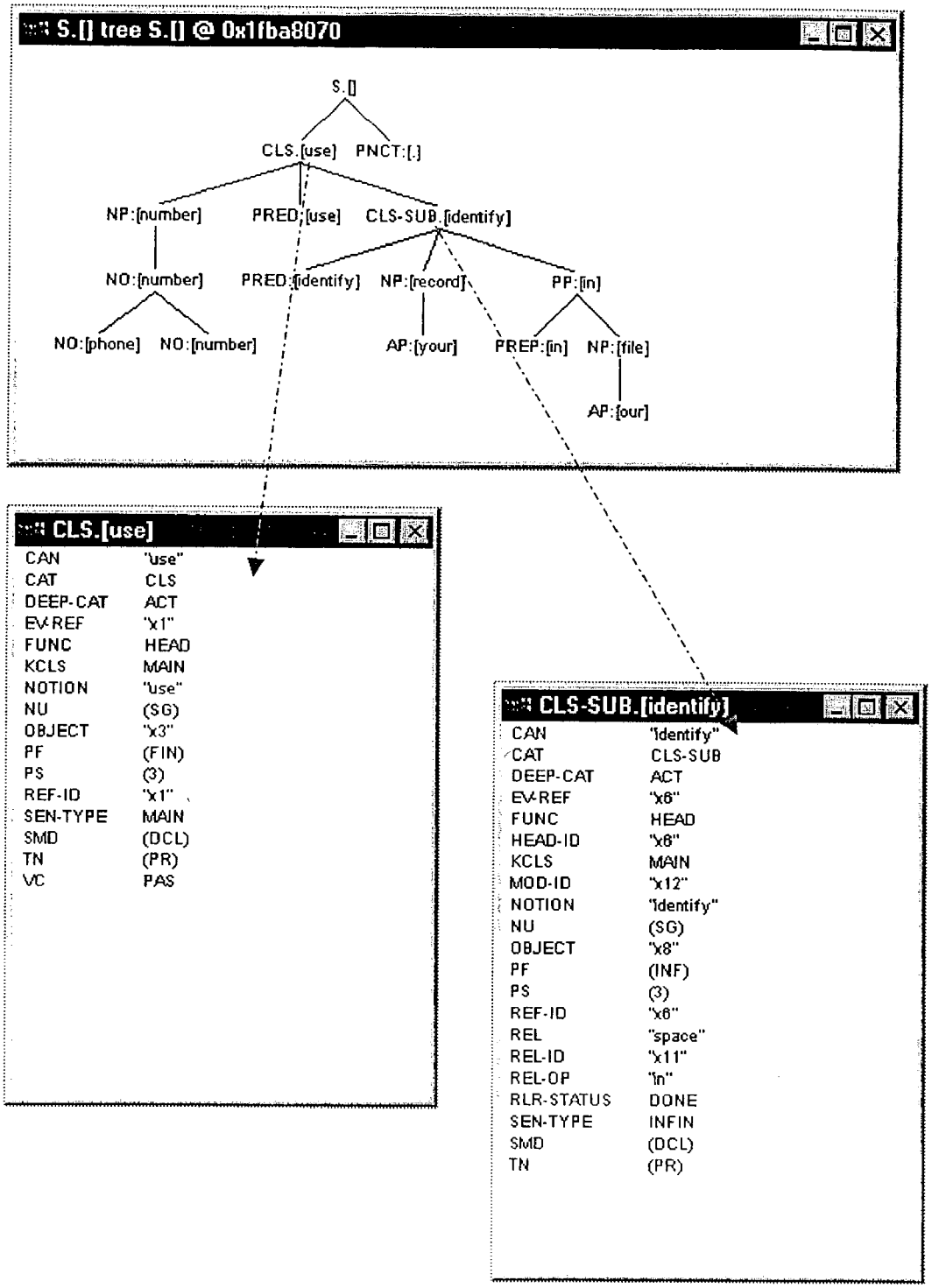

Syntactic restructuring is depicted in FIG. 10, clausal word-ordering is shown in FIG. 11.

Generation Level 6: Structure Type Realization and Expansion

This level takes care of the insertion and/or transformation of pre-defined structures, determiner insertion, as well as ordering of NP and AP sub-structures. The respective functions are struct-expansion, det-insert, np-order and ap-order. They do not have parameters.

Figure 12:
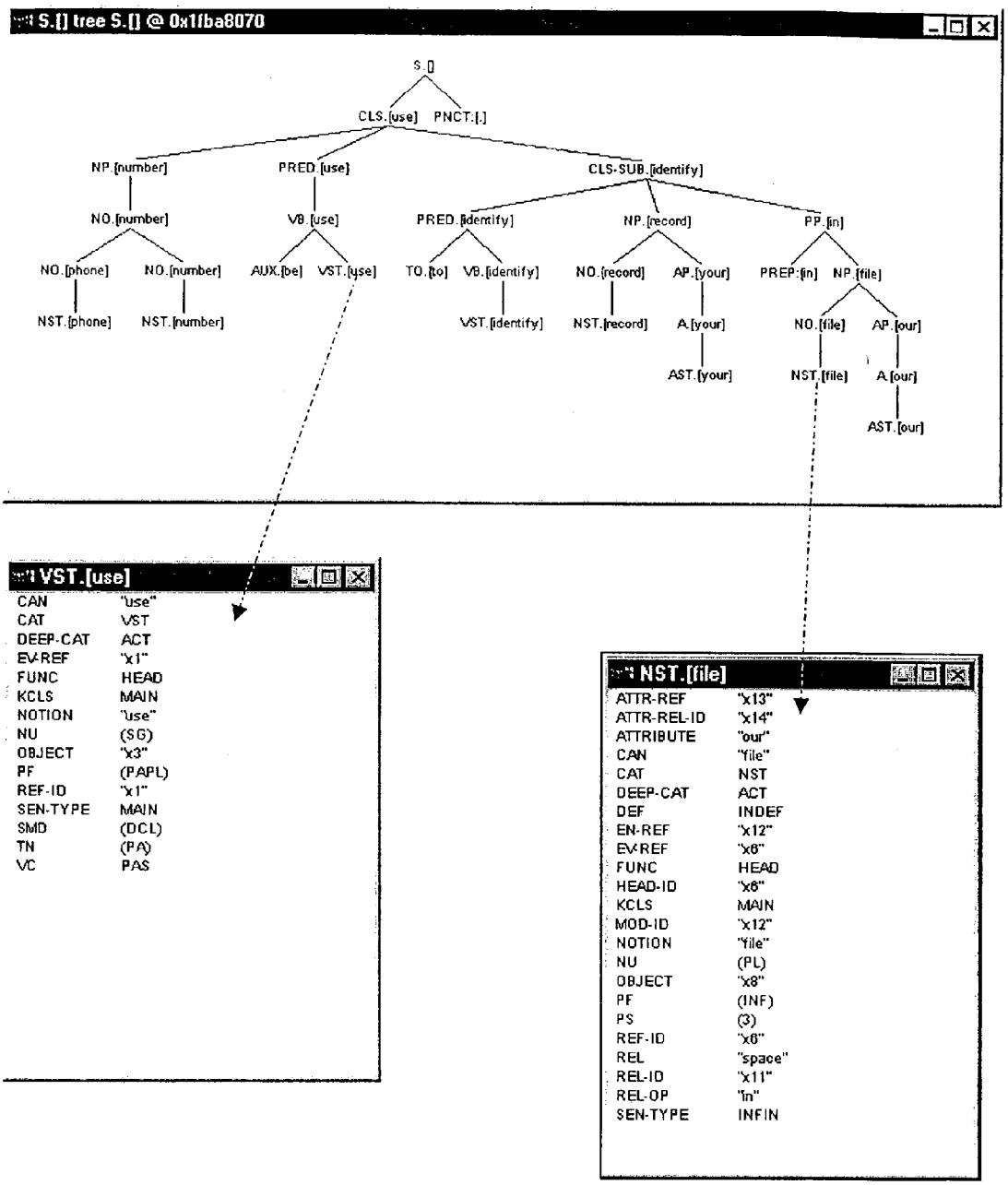
Figure 13:
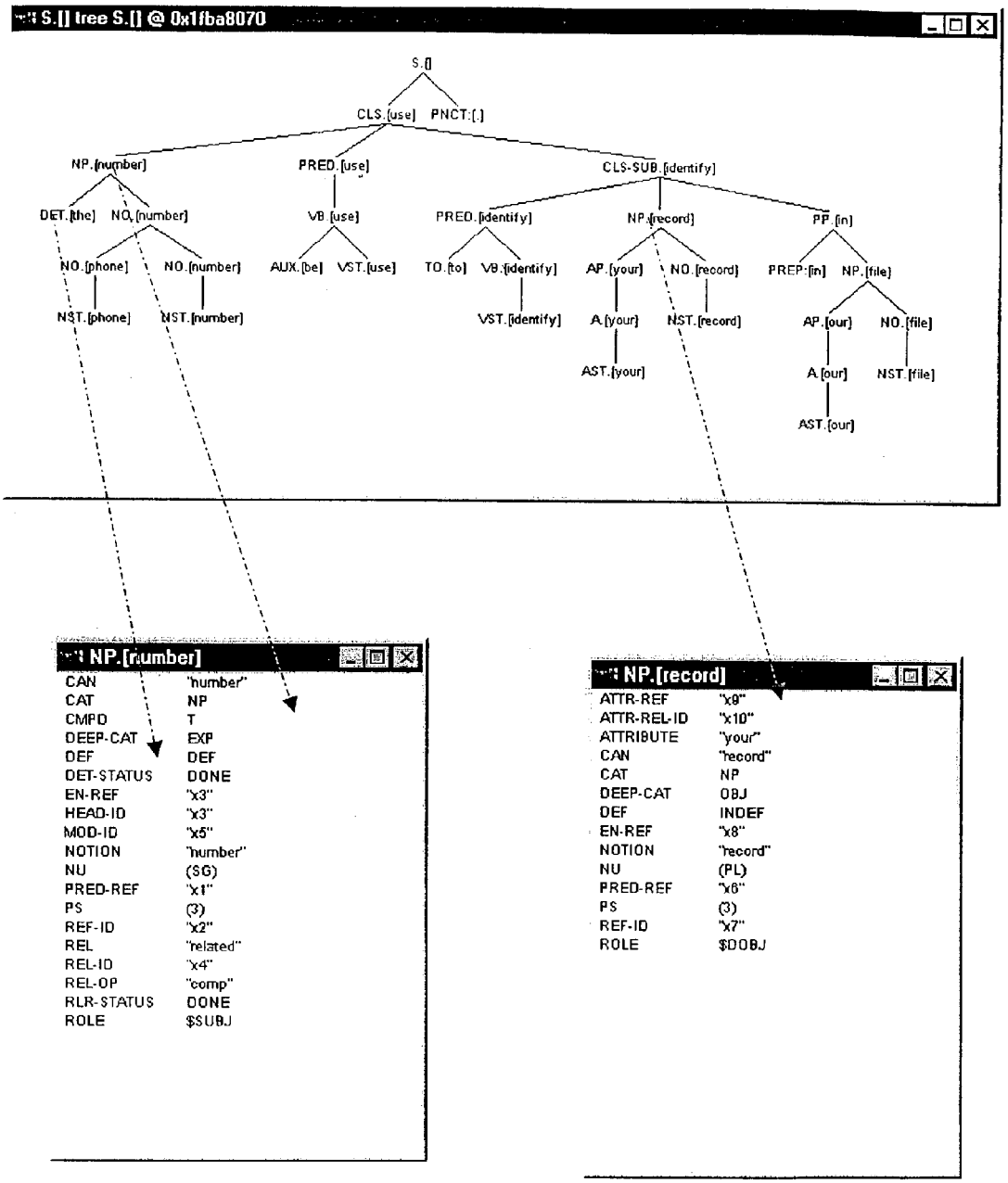

The expanded syntactic structure can be seen in FIG. 12. Phrasal ordering and determiner insertion is shown in FIG. 13.

Generation Level 7: Morphologic Generation

Figure 14:
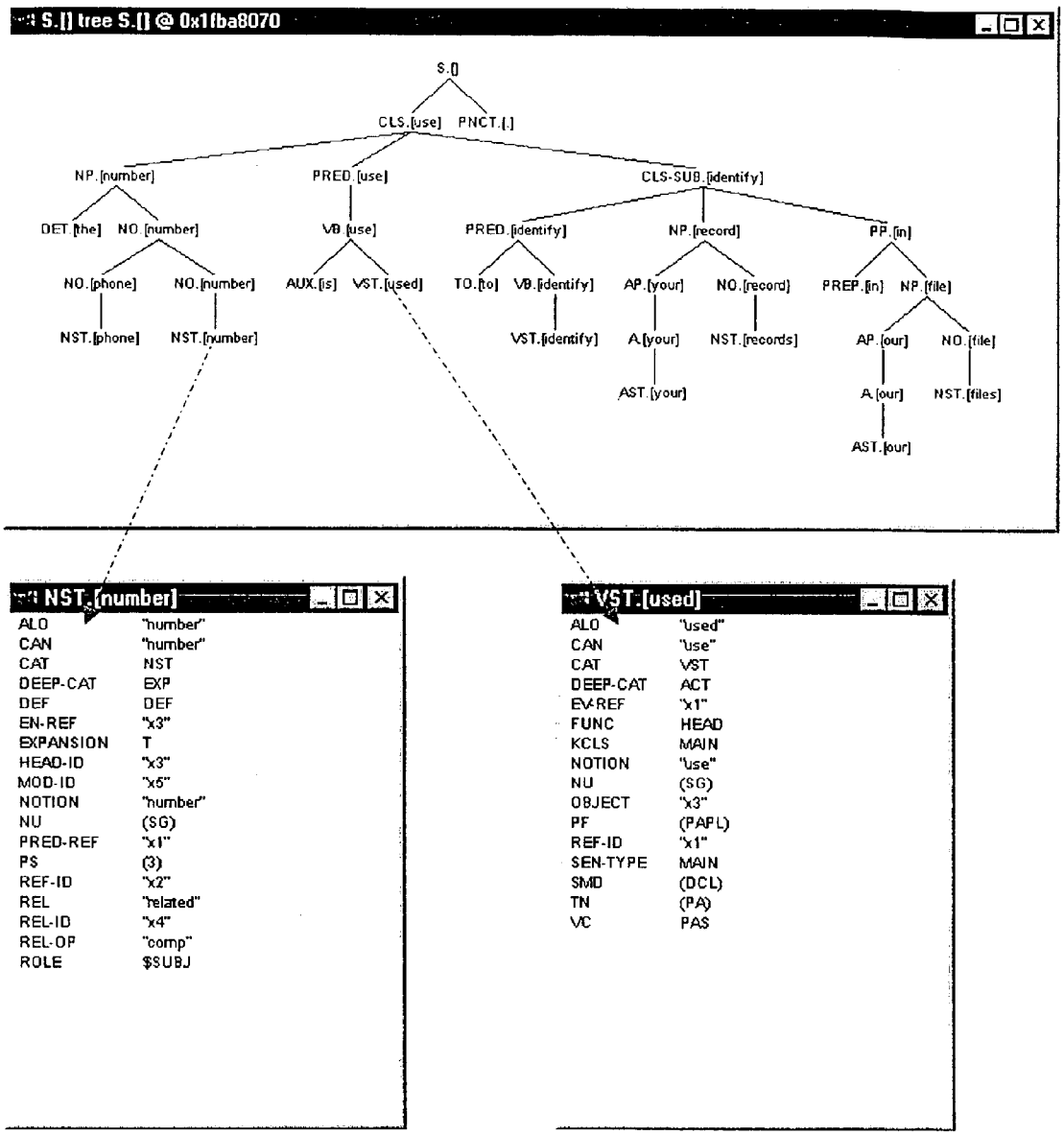

At this level, the call to the morphological generation component ('flexer tool') is performed. The respective function get-inflected-form does not have parameters. The results can be seen in FIG. 14.

Generation Level 8: Final Refinement

At this level, phonetic refinement, pretty print and cleaning operations of the tree and the node decorations are carried out. The respective functions corr-onset, mult-coord and clean-nodes do not have parameters.

Generation Level 9: Output Functions

This level provides a graphic representation of the final tree structure and output of the text string. The respective functions draw and allostr do not take any parameters.

Figure 15:
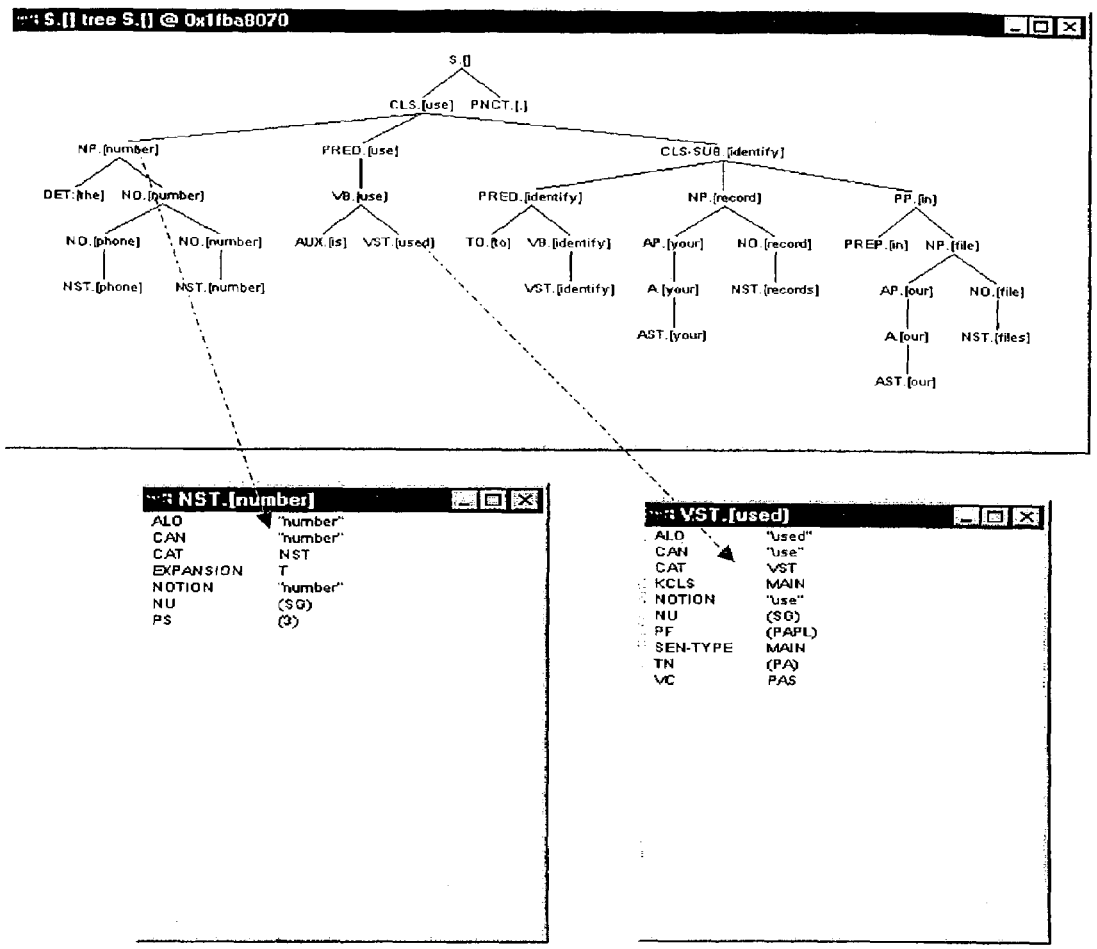

The resulting tree structure after pretty print and cleaning operations are shown in FIG. 15.

REFERENCES

Busemann, S. (1996) Best-first surface realization. In *Proceedings of the Eighth International Workshop on Natural Language Generation*, pp. 101–110.

Busemann, S. and H. Horacek (1998) A flexible shallow approach to text generation. *In Proceedings of the Ninth International Workshop on Natural Language Generation*, pp. 238–247.

Elhadad, M. (1992) *Using Argumentation to Control Lexical Choice: A Functional Unification-based Approach*. Doctoral dissertation. Columbia University, New York.

Elhadad, M. (1993) FUF: The universal unifier. User manual, version 5.2. Technical Report CUCS-038-91. Columbia University, New York.

Hovy, E. (1997) *Language Generation: Overview* (Chapter 4.1). In *Survey of the State of the Art in Human Language Technology*, Studies in Natural Language Processing. Cambridge University Press, pp. 139–146.

Joshi, A. K. (1987) Introduction to Tree Adjoining Grammar. In A. Manaster Ramer (ed) *The Mathematics of Language*, 87–114. Amsterdam: John Benjamins.

Joshi, A. K., and Y. Schabes (1997) Tree-Adjoining Grammars. In G. Rozenberg and A. Salomaa (eds.) *Handbook of Formal Languages* 69–123. Berlin: Springer-Verlag.

Knight, K and V. Hatzivassiloglou (1995) Two-level, many-paths generation. In *Proceedings of the 33rd Annual Meeting of the Association for Computational Linguistics* (ACL 1995). Cambridge, Mass., pp. 252–260.

Langkilde, I. and K. Knight (1998a) Generation that exploits corpus-based statistical knowledge. In *Proceedings of the 36th Annual Meeting of the Association for Computational Linguistics and 17th International Conference on Computational Linguistics* (COLING-ACL 1998). Montreal, Canada, pp. 704–710.

Langkilde, I. and K. Knight (1998b) The practical value of n-grams in generation. In *Proceedings of the Ninth International Workshop on Natural Language Generation*, pp. 248–255.

Mann, W. C. (1983) An overview of the Penman text generation system. In *Proceedings of the Third National*

Conference on *Artificial Intelligence* (Washington, D.C., Aug. 22–26, 1983), pp. 261–265.

McKeown, K. (1985) *Text Generation*. Cambridge: Cambridge University Press.

McRoy, S., S. Channarukul and S. S. Ali (2001) Creating natural language output for real-time applications. In *Intelligence* Volume 12, Number 2: 21–34. ACM.

Meteer, M. W., D. D. McDonald, S. D. Anderson, D. Forster, L. S. Gay, A. K. Huettner and P. Sibun (1987). Mumble-86: Design and Implementation. Technical report COINS 87—87. Computer and Information Science, University of Massachusetts at Amherst.

Reiter, E. and R. Dale (2000) *Building Natural Language Generation Systems*, Studies in Natural Language Processing. Cambridge: Cambridge University Press.

What is claimed is:

1. A method for generating natural language in computer-based dialog systems, characterized by a highly controllable procedural approach, comprising the following steps:
   - Step 1: generating an input tree with semantic-pragmatic deep structure from an input file received from a strategic component of the dialog system, wherein the input file comprises a sequence of simple semantic representation language (SSRL) statements;
   - Step 2: inserting elementary syntactic information into the tree structure and onto the tree nodes;
   - Step 3: applying elementary operations such as sub-tree insertion and manipulation, for instance, identification of coordinations, attributes and relations;
   - Step 4: accessing lexical and/or language specific information to the tree;
   - Step 5: generating syntactic structures oriented towards normalized interface structures from the structured deep syntactic input tree;
   - Step 6: realizing and expanding structure types by inserting and/or transforming of predefined structures, inserting determiners, and/or ordering of sub-structures;
   - Step 7: generating morphologic transformations;
   - Step 8: optionally, carrying out final refinements, comprising phonetic refinement, pretty print and/or cleaning operations of the tree and the node decorations;
   - Step 9: outputting a graphic representation of the final tree structure and/or a text string thereof.

2. A method according to claim 1, wherein each statement of the respective SSRL-sequence is evaluated and the results of said evaluations are represented in a flat semantic-pragmatic tree.

3. A method according to claim 1, wherein accessing lexical and/or specific information comprises application of multilingual facilities.

4. A method according to claim 1, wherein Step 4 comprises replacing notions/concepts supplied by said strategic component of the dialog system by canonical forms of said notions/concepts via lexical access.

5. A method according to claim 1, wherein Step 5 evaluates gapping phenomena and insertions as language specific parts as well as the ordering of sub-clausal structures.

6. Computer program product, which is directly loadable into an internal program memory of a digital computer, comprising software code portions, wherein the method for generating natural language in computer-based dialog systems according to claim 1 is processed within the computer when the computer product is running on the computer.

7. Computer program product according to claim 6, wherein the computer program product is stored on a computer readable medium.

* * * * *